United States Patent [19]
Olson

[11] Patent Number: 5,984,138
[45] Date of Patent: Nov. 16, 1999

[54] TANKS WITH FLOW DRILL BUSHINGS FOR RECEIVING COUPLINGS

[75] Inventor: Darwin C. Olson, Franklin, Tenn.

[73] Assignee: Dana Corporation, Toledo, Ohio

[21] Appl. No.: 08/455,912

[22] Filed: May 31, 1995

[51] Int. Cl.⁶ .............................. B65D 6/40; B65D 39/00
[52] U.S. Cl. ......................... 220/801; 220/601; 220/661
[58] Field of Search .................................. 220/601, 661, 220/565, 4.14, 801, 567.1, 567.2, 567.3; 285/192, 193, 194, 239, 382

[56] References Cited

U.S. PATENT DOCUMENTS

| | | | |
|---|---|---|---|
| 1,179,853 | 4/1916 | McCulloch | 285/382 X |
| 3,939,683 | 2/1976 | van Geffen | 72/71 |
| 4,175,413 | 11/1979 | van Geffen | 72/71 |
| 4,177,659 | 12/1979 | van Geffen | 72/71 |
| 4,185,486 | 1/1980 | van Geffen | 72/71 |
| 4,298,221 | 11/1981 | McGugan | 285/382 X |
| 4,428,214 | 1/1984 | Head, Jr. et al. | 72/69 |
| 4,454,741 | 6/1984 | Hoogenboom | 72/71 |
| 5,230,539 | 7/1993 | Olson | 285/323 |
| 5,340,166 | 8/1994 | Puttonen et al. | 285/189 |

FOREIGN PATENT DOCUMENTS 9206324  4/1992  WIPO .................................. 220/4.14

Primary Examiner—Allan N. Shoap
Assistant Examiner—Niki M. Eloshway
Attorney, Agent, or Firm—Millen, White, Zelano & Branigan, P.C.

[57] ABSTRACT

Tanks, such as air tanks and other compressed gas tanks as well as fuel tanks, have bushings formed by flowdrilling holes in the tanks after the tanks have been configured in substantially their final shape. The bushings are of the same material and unitary with the tank walls and have smooth bores which receive push-to-connect couplings. The push-to-connect couplings have at least two annular barbs which engage the walls of the bushings with an interference fit so as to prevent withdrawal of the push-to-connect couplings. The push-to-connect couplings are sealed with O-rings disposed between the barbs. The depth of insertion is determined by an annular flange on an outer collar of the push-to-connect coupling which engages the outside surface of an outer rim of the bushing.

4 Claims, 3 Drawing Sheets

TANKS WITH FLOW DRILL BUSHINGS FOR RECEIVING COUPLINGS

FIELD OF THE INVENTION

The present invention relates to tanks such as compressed gas tanks and fuel tanks which have fuel couplings attached thereto. More particularly, the present invention relates to tanks which have a push-to-connect coupling mounted through a wall thereof.

BACKGROUND OF THE INVENTION

In manufacturing tanks such as air tanks, other compressed gas tanks and fuel tanks, it is necessary to provide fluid couplings for dispensing the contents of the tanks for various uses such as operating air brakes or pneumatic tools, or for powering internal combustion engines used in vehicles, or for other purposes. In addition, it may be necessary to attach instruments such as pressure and temperature indicators to these tanks. Typically, a tank may have one or more sites at which a fluid coupling is attached. These sites may vary according to a customer's order or according to the purpose for which the tank is used.

It is current practice to punch holes through the sheet metal used for forming tank walls before the tank walls are fabricated into completely enclosed tanks. From a practical standpoint, it is impossible to effectively punch holes in a closed tank because there is no access to the interior of the tank for inserting a die against which the punch acts when making the holes.

It is not unusual for customers to relocate holes for fittings in order to make the tanks more compatible with altered design criteria. This requires the fabricator of the tank to relocate holes for fittings on a flat blank before the tank is shaped. After the tank has been shaped, the hole may not occur in the finally formed tank where it was supposed to occur or the customer may change his or her mind as to the desired location. Normally, it is not just one tank, but many tanks which end up with holes not located where the customer has either specified or would later prefer. Accordingly, it is frequently desirable to have a completed tank for the customer to inspect prior to making holes for fittings. Heretofore, this has not necessarily been practical because holes would have had to be drilled after tanks were enclosed which would result in debris accumulating in the tanks. Debris in a tank can damage equipment being operated or powered by the fluid dispensed from the tank.

Another problem has arisen with the advent of "quick-connect" couplings in which, instead of threading a coupling to a tank, couplings are simply pushed home to seat within a bushing installed on the tank. A prior art method of installing a bushing on a tank is to weld the bushing to the exterior of the tank in order to provide a smooth bore into which the quick-connect coupling is inserted. It is very important to inspect the weld to make sure that the weld is fluid-tight and that the weld is sound, otherwise, there is a possibility of fluid leaking or, in the case of tanks containing compressed gas, the possibility of the weld blowing out. Inspecting welds for integrity is not an inexpensive, risk-free task.

In view of the aforementioned considerations, there is a need for improvement in techniques for providing tanks with holes for fittings.

SUMMARY OF THE INVENTION

The present invention relates to tanks, such as compressed gas tanks or fuel tanks wherein the tanks have a wall of a selected material, in which wall a bore is provided for slidabily receiving a fluid coupling. The coupling is secured in the bore by radially projecting portions thereof which prevent the coupling from being removed from the bore. The improvement to which the invention relates comprises a bushing configured from the same material from which the wall of the tank is fabricated so that the bushing is unitary with the wall of the tank and provides an inner surface defining the bore. In order for the bore to receive a substantial portion of the coupling so that both retaining and sealing members engage the surface of the bore, the bore has an axial length substantially greater than the thickness of the wall and sufficient for engagement by both the retaining and sealing members.

In a further aspect, the present invention relates to a method specifically for fabricating a tank having a wall with a bore disposed therein, wherein the bore defines a cylindrical wall for receiving a coupling, the coupling having at least one retaining member for retaining the coupling within the bore and one sealing member for sealing with the bore. In accordance with the method, at least one bushing is formed on the tank by flow drilling a bore at a selected site on the tank wall after the tank wall has been configured into a selected shape, which at least approximates the final shape of the tank. By flow drilling the bore, the inner wall of the bore is of the same material as the selected site.

In still a further aspect, the present invention relates to a push-to-connect coupling for mounting in an unstepped bore wherein the push-to-connect coupling includes at lest one barb for engaging the surface of the bore, a seal for sealing with the bore and a stop for axially positioning the coupling in the bore.

BRIEF DESCRIPTION OF THE DRAWINGS

Various other features and attendant advantages of the present invention will be more fully appreciated as the same becomes better understood when considered in conjunction with the accompanying drawings in which like reference characters designate the same or similar parts throughout the several views, and wherein.

DETAILED DESCRIPTION

Figure 1:
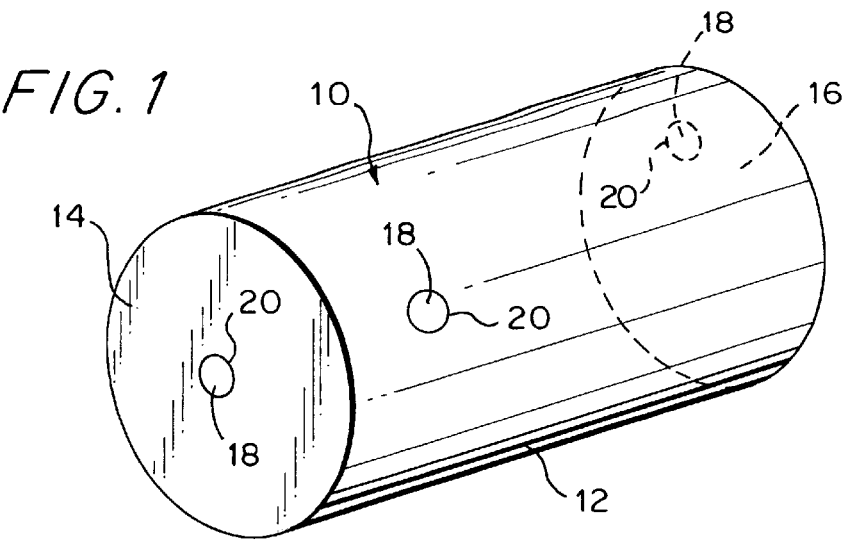
FIG. 1 is a perspective view of a cylindrical tank having holes therein for receiving fittings.
Figure 2:
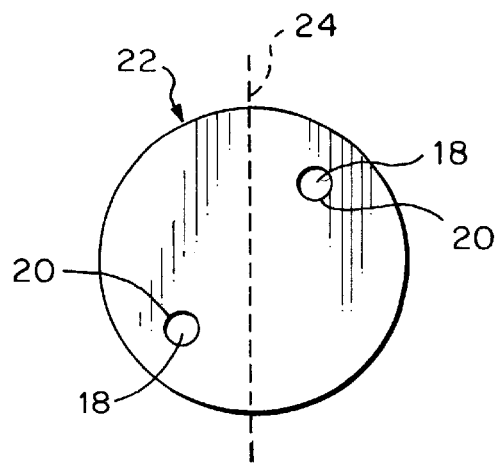
FIG. 2 is a side view of a spherical tank.

Referring now to FIG. 1 there is shown a cylindrical tank 10 having a cylindrical body portion 12, which substantially defines the space within the tank, and two end plates 14 and 16 which may be flat, convex or concave. Tanks such as the tank 10 of FIG. 1 have holes 18 therein which may be disposed at various sites 20 in the walls 12, 14 and 16 of the tank. The holes 18 are provided usually for receiving fluid couplings, which in accordance with the principals of the present invention are preferably quick-connect couplings such as the coupling illustrated in FIGS. 6 and 7. Since the sites 20 may vary in location from tank to tank or for various manufacturing runs of tanks 10, it is preferable that the holes 18 be formed subsequent to configuring the tank as illustrated in FIG. 1, rather than making the holes in the flat blanks of sheet material from which the circular ends 14 and 16 and cylindrical portion 12 are made. In FIG. 2, the tank 22 is spherical and the sites 20 and holes 18 are selected and made subsequent to forming the tank.

Figure 3:
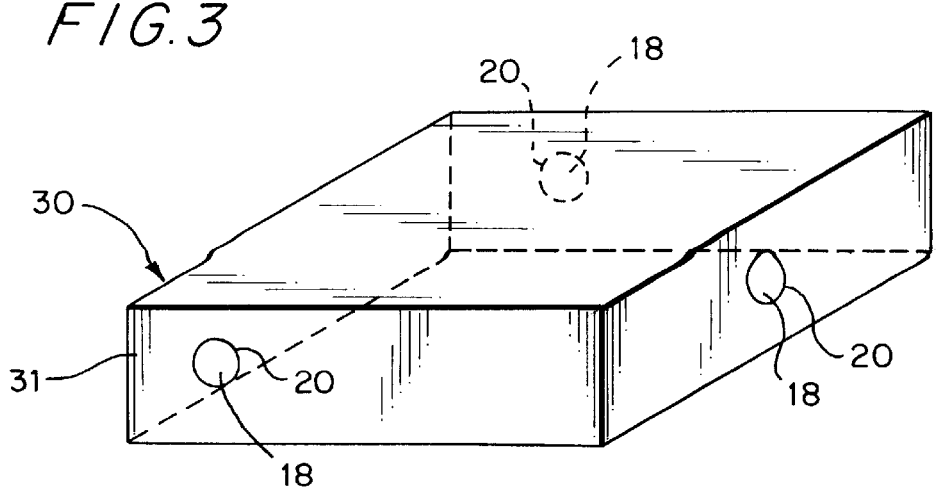
FIG. 3 is a perspective view of a tank representative of any selected shape having holes therein for receiving fittings.

Referring now to FIG. 3 there is shown a tank 30 having a shape which is not necessarily symmetrical. Again, sites 20 at which the holes 18 are located may be disposed at various locations in the walls 29 of the tank 30 and, again, according to the present invention, it is desirable that the tank have substantially its final shape before the holes 18 are made.

Figure 4:
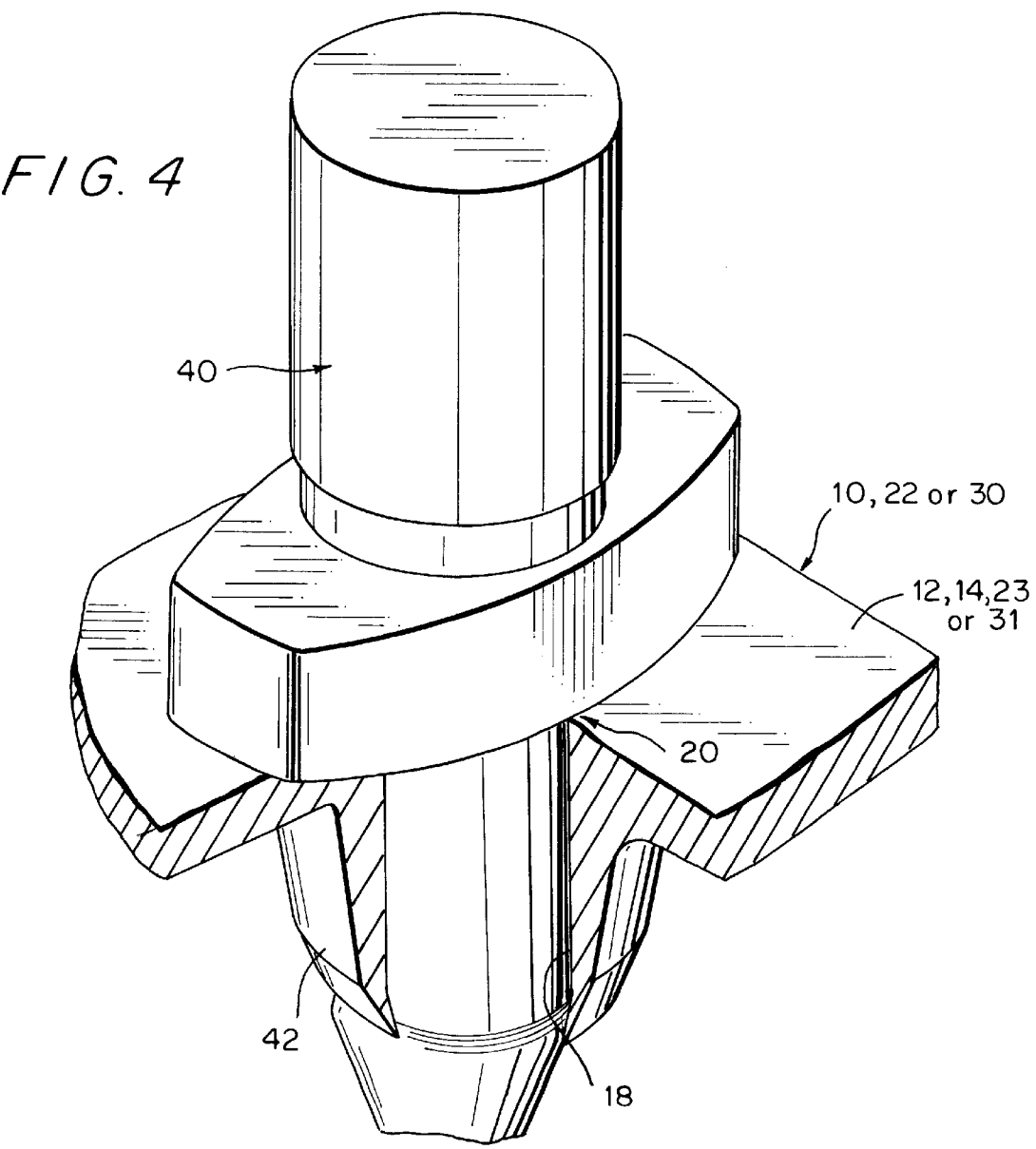
FIG. 4 is a perspective view showing how the bushing of FIG. 5 is formed.
Figure 5:
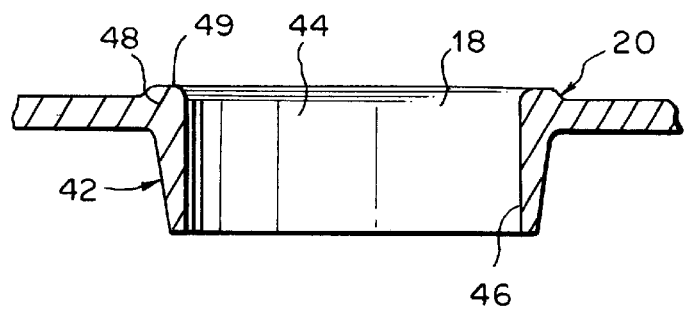
FIG. 5 is a side elevation of a bushing disposed around one of the holes formed in the tanks shown in FIGS. 1–3 and configured in accordance with the principals of the present invention.

Referring now to FIGS. 4 and 5, the holes 18 are formed in the walls 12, 14, 16 and 29 by the flow drill process wherein a drill bit 40 is rotated at very high speed and pressed with high axial force into the wall of already formed tanks 10 or 30 to form a bushing 42 at selected location 20. The flow drill process is a well-known process described in patents such as U.S. Pat. Nos. 4,428,214 and 4,175,413, both of which are incorporated herein by reference. In addition, flow drill technology is available from Handler Machinery, Inc. of Northbrook, Illinois which sells flow drill bits such as the bit 40 shown in FIG. 4.

Referring now more specifically to FIG. 5, it is seen that each of the holes 18 are formed in a bore 44 defined by a cylindrical surface 46 in the bushing 42. The bushing 42, including the cylindrical surface 46 and an exterior rim 48, is of the same material as the site 20 of the hole 18. The site 20 is of the same material as the wall 12, 14, or 29 of the tank 10 or 30, respectively in which the hole 18 is formed. Accordingly, each bushing 42 is unitary with the wall of the tank 10 or 30 in which the hole 18 is formed. By so forming the bushing 42, the material of the site 20 is not removed from the wall, but is rather retained and reformed into the bushing 42. Consequently, there is no debris generated by making the holes 18, which debris would necessarily accumulate in the tanks 10 and 30.

The material forming the walls 12, 14, 16 or 29 of the tanks 10 and 30, respectively is preferably metal such as aluminum, steel, but also may be other materials, such as resins which flow when drilled so as to form bushings such as the bushing 42.

Figure 6:
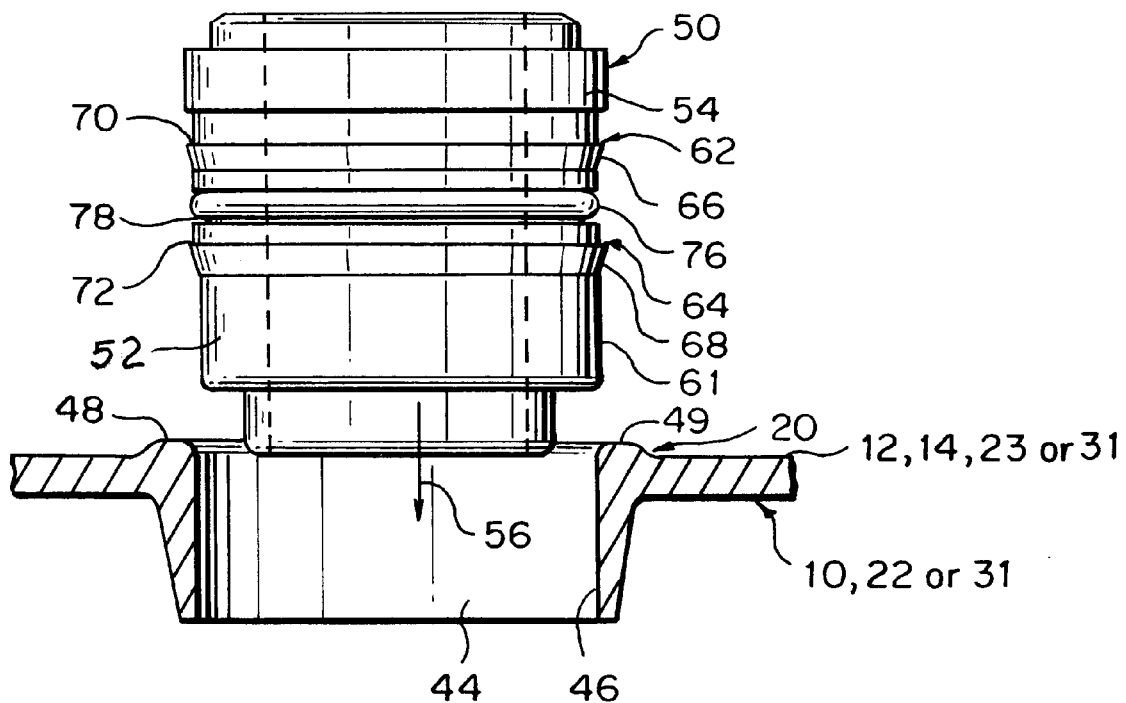
FIG. 6 is a side elevation showing the bushing of FIG. 5 receiving a push-to-connect coupling to form a fluid coupling in accordance with the principals of the present invention.
Figure 7:
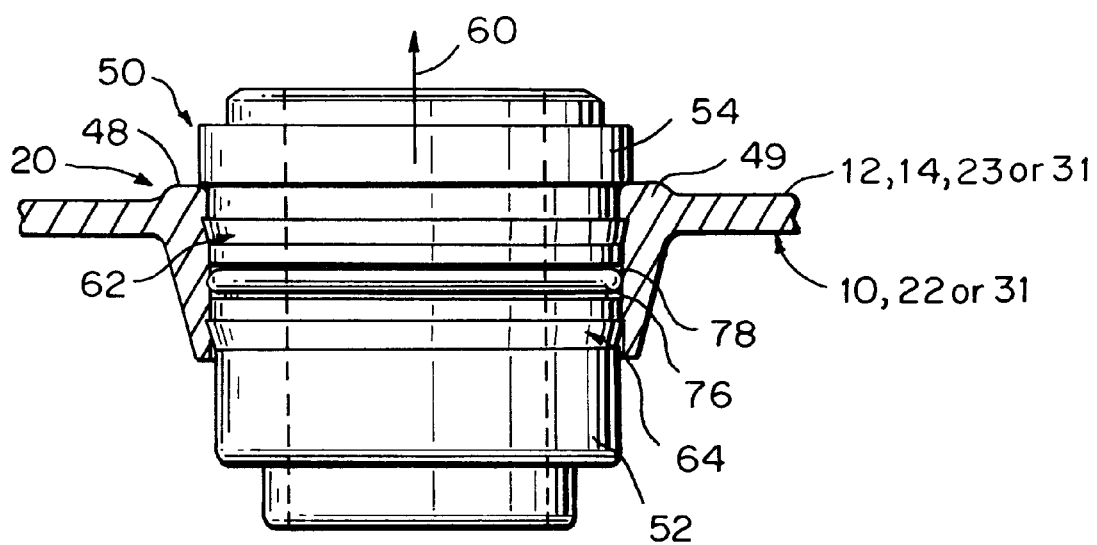
FIG. 7 is a view similar to FIG. 6, but showing the push-to-connect coupling of FIG. 5 seated in the bushing of FIG. 5.

Referring now to FIGS. 6 and 7 there is shown a push-to-connect coupling 50 received within the bore 44 defined by the cylindrical wall 46 of the bushing 42. Such couplings 50 are of the type disclosed in U.S. patent applications, Ser. Nos. 08/417,836; 08/151,880; 08/308,895 and 08/358,889, filed Apr. 6, 1995; Nov. 15, 1993; Sep. 20, 1994 and Dec. 19, 1994, respectively; and U.S. Pat. No. 5,230,539, all assigned to the assignee of the present invention and incorporated herein by reference. The push-to-connect coupling 50 of the present invention includes a sleeve 52 which has annular end flange 54 with a diameter greater than the diameter of the bore 44 so that when the push-to-connect coupling is pushed into the bore in the direction of arrow 56, the flange 54 abuts the outer surface of the rim 48 that faces outwardly from the tank wall 12, 14 or 29. This limits movement of the push-to-connect coupling 50 into the tank in the direction of arrow 56 and axially positions the coupling in the bore 44.

In order to retain the push-to-connect coupling 50 in the bore 44 so that it cannot move outwardly in the direction of arrow 60, the surface 61 of the coupling has at least one, and preferably two or more annular barbs 62 and 64 are provided on outer cylindrical surface 65 of the sleeve 52 of the coupling. The annular barbs 62 and 64 have ramp portions 66 and 68, respectively which allow the sleeve 52 to be inserted into the bore 44 and shoulder portions 70 and 72 which extend perpendicular to the direction of arrows 56 and 60 which provide an interference fit with the cylindrical surface 46 of the bore 44 so as to prevent movement of the coupling 50 in the direction of arrow 60.

In order to seal the outer cylindrical surface 65 of the collar 52 of the push-to-connect coupling 50 with the cylindrical wall 46, an O-ring 76 is received within an outer annular groove 78 in the cylindrical surface 65 of the sleeve 52. Preferably, the groove 78 is disposed between the annular barbs 70 and 72 so as to seat the O-ring 76 between the barbs; however, the O-ring may be positioned at other locations, such as on either side of the barbs 62 and 64 or between the flange 54 and the front surface 49 of the rim 48.

By using the arrangement disclosed in FIGS. 6 and 7, it is not necessary to provide the tanks 10 and 30 with a separate bushing which is welded or otherwise affixed thereto since bushing 42 provides essentially the same structure without the added expense and risk of welding a bushing to the tank.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a push-to-connect coupling for mounting in an unstopped bore having a cylindrical surface, the bore being through a metal or plastic wall having an outside surface, the improvement comprising:

an outer sleeve having an external surface on which at least one barb is positioned for engaging the surface of the wall of the bore and on which a peripheral seal is positioned for sealing the bore; and a stop on the coupling for engaging the outside surface of the wall adjacent to the bore arresting insertion of the coupling into the bore wherein the barb prevents extraction of the coupling and the stop locates the axial position of the coupling with respect to the bore.

2. The improvement of claim 1 wherein the coupling sleeve is cylindrical and the barb and peripheral seal are annular.

3. The improvement of claim 1 wherein the sleeve is cylindrical, there are at least two barbs at least one of which is annular and wherein the seal is an O-ring seated in a groove between the barbs.

4. The improvement of claim 3 wherein the stop is an annular flange disposed at one end of the sleeve.

* * * * *